United States Patent
Serebrennikov

(10) Patent No.: US 7,669,703 B2
(45) Date of Patent: Mar. 2, 2010

(54) PROCESS AND DEVICE FOR THE REDUCTION OF CLUTCH-GRABBING OSCILLATIONS IN A MOTOR VEHICLE DRIVE TRAIN

(75) Inventor: Boris Serebrennikov, Baden-Baden (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 412 days.

(21) Appl. No.: 11/714,930

(22) Filed: Mar. 7, 2007

(65) Prior Publication Data
US 2007/0209900 A1 Sep. 13, 2007

(30) Foreign Application Priority Data
Mar. 8, 2006 (DE) .................. 10 2006 010 626

(51) Int. Cl.
*F16D 48/06* (2006.01)
*F16D 27/00* (2006.01)
(52) U.S. Cl. .............. 192/84.6; 192/30 V; 192/84.1; 701/67; 318/433
(58) Field of Classification Search ................ 192/84.6
See application file for complete search history.

(56) References Cited
U.S. PATENT DOCUMENTS
7,188,717 B2 * 3/2007 Hoshiya et al. ........... 192/3.63
7,299,120 B2 * 11/2007 Serebrennikov ............. 701/67
2004/0188218 A1 * 9/2004 Berger et al. ................ 192/90
2005/0189192 A1 * 9/2005 Serebrennikov ......... 192/30 V
2006/0016662 A1 * 1/2006 Baehr et al. ............ 192/85 CA

FOREIGN PATENT DOCUMENTS
WO 2004/027285 4/2004

* cited by examiner

*Primary Examiner*—David D Le
*Assistant Examiner*—Ryan Dodd
(74) *Attorney, Agent, or Firm*—Simpson & Simpson, PLLC

(57) ABSTRACT

Process for reducing clutch-grabbing oscillations in a motor vehicle drive train having a drive motor, clutch and another drive train, in which process the moment transmitted by the clutch for the control of an actuator that operates an operating member of the clutch when oscillations occur is changed such that oscillations are diminished, where an electric voltage driving the actuator is modulated according to the formula:

$$U_M = U_{MSt} \cdot w + U_{MR} \cdot (1-w), \text{ whereby,}$$

w is a weighting factor which assumes a value between 0 and 1, $U_{MSt}$ is a modulation voltage controlled in a defined manner by an actuator model and a required travel modulation and, $U_{MR}$ is a modulation voltage regulated by a control device, which voltage is a magnitude that characterizes an operating state of the clutch on the basis of deviation between a required value and the actual value.

5 Claims, 1 Drawing Sheet

PROCESS AND DEVICE FOR THE REDUCTION OF CLUTCH-GRABBING OSCILLATIONS IN A MOTOR VEHICLE DRIVE TRAIN

CROSS-REFERENCE TO RELATED APPLICATIONS

This patent claims priority of German Patent Application No. 10 2006 010 626.1, filed Mar. 8, 2006, which application is incorporated herein by reference.

FIELD OF THE INVENTION

This invention relates to a process and a device for the reduction of clutch-grabbing oscillations in a motor vehicle drive train.

BACKGROUND OF THE INVENTION

Automated clutches or clutches operated by an actuator are increasingly used in modern motor vehicles, both in conjunction with manual transmissions and in conjunction with automatic gears. Due to the elasticities contained in it, the drive train of a motor vehicle can be excited into oscillations that unpleasantly impair driving comfort.

WO 2004/027285 A1 discloses a method for the reduction of clutch-grabbing oscillations of the drive train whereby such clutch-grabbing oscillations occur primarily during the engagement of the clutch when starting up or after a gear change. The torque that can be transmitted by the clutch and/or the clutch travel can be so modulated in the process that the clutch-grabbing oscillations are counteracted. The required travel of an operating member of the clutch is modulated in an additive fashion, something that results in a modulation of the actual adjustment travel of the operating member and thus to a modulation of the transmissible clutch moment. Effective advance phase control can be accomplished in case the positional or attitude control is of good quality. Here, travel modulation sufficiently well meets an oncoming half-wave of the oscillating gear input rpm in order considerably to diminish or entirely extinguish the gear grabbing. A reproducible adjustment of travel modulation is a problem because the travel is measured in an incremental fashion and because the amplitude of a travel modulation amounts to only about 5 to 10 increments. In case of a clutch-grabbing oscillation period of 100 msec, a modulation takes 40 to 50 msec. During that short span of time, the attitude controller is called up 16 to 20 times. That includes compulsory controller call-ups within which the controller does not get to see any change in the actual travel. This means that the D-share [average share] of the controller becomes very rough, something that causes a deterioration in the quality of the controlling function and leads to unnecessary energy loss in the actuator.

SUMMARY OF THE INVENTION

The object of the invention is to provide a process and a device for the reduction of clutch-grabbing oscillations in a motor vehicle drive train by means of which it is possible or which, in case of low energy consumption, will make it possible effectively to diminish or suppress clutch-grabbing oscillations without disadvantageously impairing the controlling quality of a system that controls the operation of the clutch.

In an invention-based process for the reduction of clutch-grabbing oscillations in a motor vehicle drive train with a drive motor that can be connected via a clutch with another drive train while transmitting the torque in which process the moment actuating the clutch is so changed by control of an actuator that operates an operating member of the clutch that the clutch-grabbing oscillations are diminished; an electrical voltage that determines the operation of the actuator is modulated in accordance with the following formula:

$$U_M = U_{MSt}*w + U_{MR}*(1-w), \text{ whereby}$$

w is a weighting factor that can assume values of between 0 and 1, $U_{MSt}$ is a modulation voltage that is controlled in a defined manner by an actuator model and a required travel modulation and $U_{MR}$ is a modulation voltage regulated by a control device, which voltage is a magnitude that characterizes an operating state of the clutch on the basis of the deviation between a required value and the actual value.

The actuator model, for example, can be given by the following equation:

$$\ddot{x} - k*\dot{x} = K_U*U, \text{ whereby}$$

x is an adjustment travel of a part moved by the actuator, $$k = (i_{total}*K\Phi)^2/M_{actuator}R_a \text{ and } K_U = I_{total}*K\Phi/M_{actuator}R_a, \text{ whereby}$$

$M_{actuator} = I_{E-motor}*i^2_{total}$, $I_{total}$ = Total gear ratio, $K\Phi$ = electrical constant of the electric motor forming the actuator, and $R_a$ = resistance.

Advantageously, one must insert in the equation $$\ddot{x} - k*\dot{x} = K_U*U$$

a required modulation function $x_{SM}(t)$ so that the controlled modulation control voltage $U_{MSt}$ will be given by the resultant voltage $U(t)$.

A modulation voltage $U_M(t)$ can be multiplied by a factor that depends on the amplitude of the clutch-grabbing oscillation.

Furthermore, to the modulation voltage $U_M(t)$, one can add an offset voltage that depends on the clutch position and the operating direction of the clutch.

In a device for the reduction of clutch-grabbing oscillations in a motor vehicle drive train with a drive motor that can be connected via a clutch with another drive train in a torque-transmitting manner containing an electric motor actuator for the operation of the clutch, at least one sensor for the acquisition of clutch-grabbing oscillations in the drive train and an electronic control device that so controls the operation of the actuator that the moment that can be transmitted by the clutch has a value that will depend on the operating conditions of the drive train, the electronic control device controlling the actuator according to one of the abovementioned processes.

BRIEF DESCRIPTION OF THE DRAWINGS

The invention will be explained below with the help of diagrammatic illustrations by way of example and with further details, in which.

DETAILED DESCRIPTION OF THE INVENTION

Figure 1:
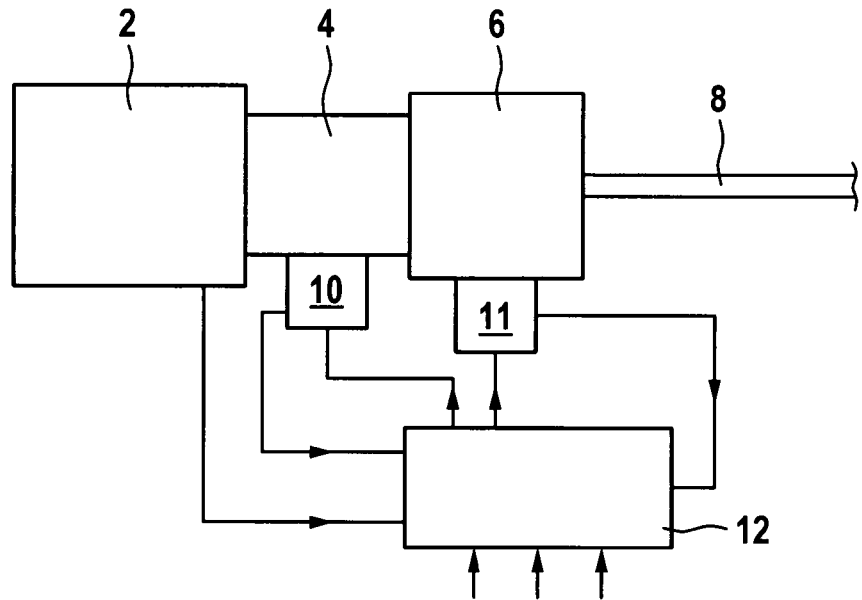
FIG. 1 is a block diagram of a known motor vehicle drive train with parts of its control device; and, FIG. 2 is an electric motor clutch actuator with control device.

According to FIG. 1, a motor vehicle drive train has internal combustion engine 2 that is connected via clutch 4, for example, a friction clutch with gear 6 whose output shaft 8 leads to driven wheels of the vehicle.

Clutch 4 can be operated by means of operating device 10. Gear 6 can be operated by means of operating device 11 in case it is an automatic gear. To control operating device 10 and 11, one uses electronic control device 12 to whose inputs for the moment to be transmitted by the clutch and the switching of gear 6 there are supplied relevant input magnitudes such as gas pedal position, effective transmission of gear 6, number of revolutions of the internal combustion engine, number of revolutions of at least one vehicle wheel, slip of clutch 4 (difference in the number of revolutions between the clutch input shaft and the clutch output shaft or the gear input shaft), position of the clutch, position of the gear, etc. Outputs of the electronic control device are connected with operating devices 10 and 11.

Figure 2:
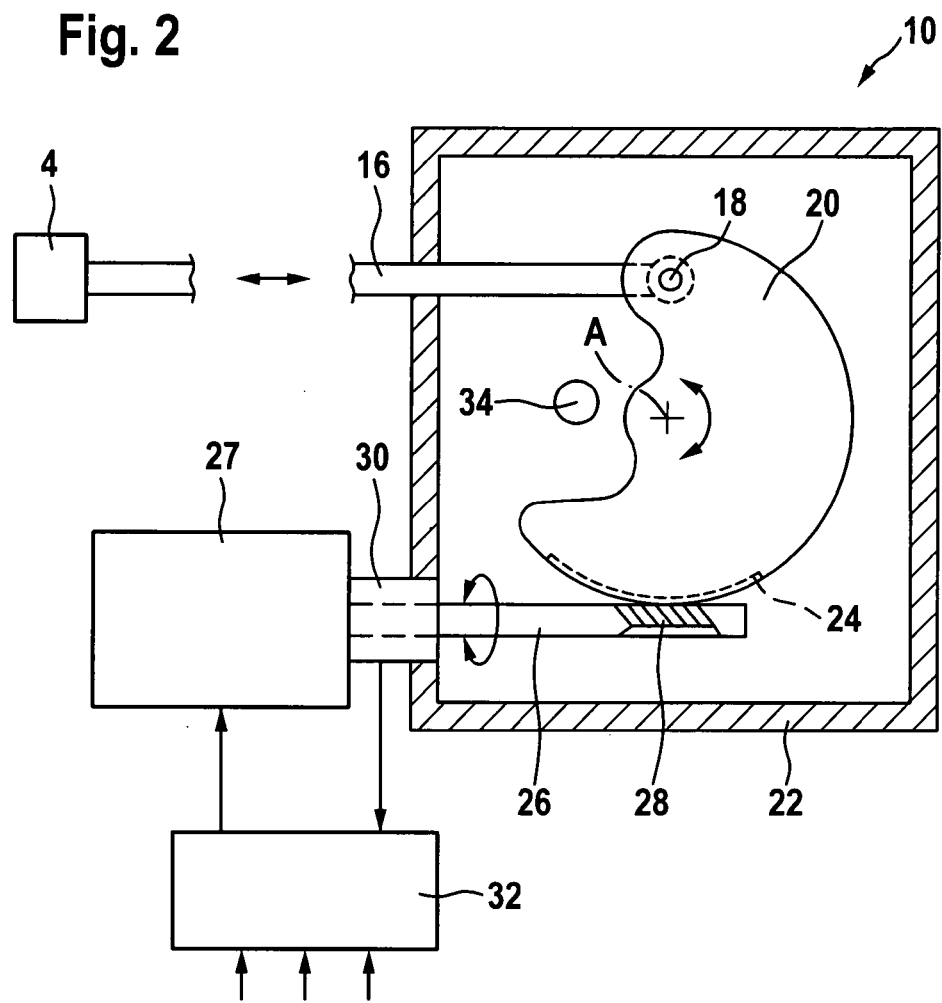

FIG. 2 shows an exemplary structure of operating device 10.

Operating device 10 contains operating member 16 that is connected directly via other coupling links or via a hydraulic transmission distance with a clutch lever of clutch 4, whereby the position of the clutch lever determines the moment that can be transmitted by the clutch.

Operating member 16 is connected with bearing 18 with segmental wheel 20 that is positioned rotatably around an axis A in housing 22. Housing 22 can be connected rigidly with the housing of the clutch or a gear housing.

Along a circumferential area, segmental wheel 20 has toothing 24 that engages worm gear toothing 28 on output shaft 26 of electric motor 27. Incremental counter 30 is provided to acquire the rotation of output shaft 26.

To control electric motor 27, one uses electronic control unit 32 with microprocessor and pertinent memory devices, which can be part of electronic control device 12 (FIG. 1). An input of control unit 32 is connected with incremental counter 30 and other inputs are connected with outputs of sensors or with another control unit, possibly by a bus via which control unit 32 receives data that are relevant for the operation of clutch 4. An output of control unit 32 is connected with electric motor 27, which constitutes the actuator of the clutch.

The rotatability of segmental wheel 20 is limited by at least one stop 34 upon which rests the segmental wheel at the end of the operating travel of operating member 16 in the engaging and/or disengaging direction of the clutch.

Stored in control unit 32 is at least one required characteristic of clutch 4 that indicates the transmissible clutch moment as a function of the position of operating member 16. To make sure that this position is known in control unit 32, the position of operating member 16, whose adjustment corresponds to the count of incremental counter 30, is again and again updated or referenced in the known manner in that, for example, operating member 16 is operated all the way to the stop.

Clutch 4 or the position of operating member 16 is adjusted in many operating areas, in particular, when starting up and after a switching function in such a way that a predetermined transmissible clutch moment is started up in a pre-controlled fashion as a function, for example, of the motor moment, the number of revolutions of the motor and the number of revolutions of output shaft 8, and the further engagement of the clutch is then accomplished in a regulated fashion in that a predetermined clutch slip is maintained and then reduced. For other operating states of the drive train, for example, when driving with a very low engine rpm under load, it is advantageous to control the slip of the clutch in order to reduce any roughness that the vehicle passengers would otherwise feel.

As a result of elasticities in the drive train, the transition between static friction and sliding friction, there can develop clutch-grabbing oscillations or drive train oscillations, especially when the clutch is engaged, which oscillations are unpleasant for the vehicle passengers. Such clutch-grabbing frictions can be recognized by fluctuations in the number of revolutions of the gear input shaft whose frequency is greater than the frequency with which the travel of operating member 16 normally changes or with which the position of a power adjustment member of internal combustion engine 2 will change.

The arrangements described so far are known as regards their structure and their function and will therefore not be explained in detail.

According to the invention, one can counteract clutch-grabbing oscillations present in the drive train, which oscillations, for example, can be acquired by oscillations of the number of revolutions of the input shaft of gear 6 that simultaneously can form the output shaft of clutch 4 in such a way that the voltage U, controlled by control unit 32 and applied to electric motor 27, is modulated in accordance with the following formula:

$$U_M = U_{MSt} * w + U_{MR} * (1-w), \text{ whereby} \quad (1)$$

$U_M$ is the modulation voltage, $U_{MSt}$ is a modulation voltage that is controlled in a defined manner by an actuator model and a required travel modulation and $U_{MR}$ is a modulation voltage that is regulated by a regulator contained in control unit 12, which modulation voltage depends on the deviation between, for example, a required position of operating member 16 and its actual position. "w" is a weighting factor that determines the weighting between the control and the regulation of modulation voltage $U_M$. This weighting factor can be set in advance or can change as a function of the operating states of the drive train.

The controlled modulation voltage $U_{MSt}$ is defined on the basis of an actuator model and the required travel modulation.

The model of the actuator dynamic can be described, for example, by the following equation:

$$\ddot{x} - k * \dot{x} = K_U * U, \text{ whereby} \quad (2)$$

x is an adjustment travel of a part moved by the actuator, for example, actuation member 16:

$k = (i_{total} * K\Phi)^2 / M_{actuator} R_a$ and $K_U = I_{total} * K\Phi / M_{actuator} R_a$, whereby $M_{actuator} = I_{E-motor} * i^2_{total}$, $I_{E-motor}$ = Inertial moment of the electric motor, $I_{total}$ = Total gear ratio, $K\Phi$ = electrical constant of the electric motor forming the actuator, and $R_a$ = resistance.

To attenuate or suppress the clutch-grabbing oscillations, for example, one determines in the known manner a bell-shaped modulation function $x_{SM(t)}$, which is inserted in equation (2). The desired control modulation voltage $U_{MSt}$=U(t) can then be calculated from equation (2). When a travel modulation is to be made in accordance with the form of the required travel modulation, then the modulated control voltage $U_{MSt}$ is modulated by a factor whose magnitude, for example, depends on the intensity or amplitude of the clutch-grabbing oscillation. When w is inserted in equation (1) as 1, then the modulation voltage, thus determined, is the voltage that is superposed on the normal actuator control voltage in order to reduce the clutch-grabbing oscillations.

The actuator dynamic model corresponding to equation (2) considers only the movement of the equivalent actuator mass without friction and coupling force. If necessary, this model can be expanded in order to consider these forces. We then get the following value for the control modulation voltage:

$$U_{MSt}=U(t)+\text{Offset, whereby}$$

The offset value, for example, depends on the position of the clutch or the position of the operating member and the momentary operating direction of the clutch.

When the actuator model and its parameterization are satisfactory, then it is possible in equation (1) to set w equal to 1 so that one can counteract the clutch-grabbing oscillation only by means of a controlled modulation voltage. The travel quality is then independent of the quality of the travel measurement and the energy, supplied to electric motor 27 for modulation, is used effectively.

When the model parameters are not precisely known or when they display a strong scatter or temperature dependence, then another value of w can be advantageous where the desired quality of travel modulation is attained by a mixture consisting of control and regulation.

LIST OF REFERENCE NUMBERS

2 Internal combustion engine
4 Coupling
6 Gear
8 Output shaft
10 Operating device
11 Operating device
12 Electric control device
16 Operating member
18 Bearing
20 Segmental wheel
22 Housing
24 Toothing
26 Output shaft
27 Electric motor
28 Worm gear toothing
30 Incremental counter
32 Control unit
34 Stop

What I claim is:

1. A process for the reduction of clutch-grabbing oscillations in a motor vehicle drive, wherein a first drive train portion is connectable by a clutch with a second drive train portion in a torque-transmitting manner, wherein if clutch-grabbing oscillations are detected, a moment, transmitted by the clutch, is changed to counteract the clutch-grabbing oscillations by controlling an actuator that operates an operating member of the clutch in such a manner that the clutch-grabbing oscillations are diminished, wherein the process comprises:

determining a controlled modulation voltage by inserting a function defining a required travel modulation into a formula which represents a model for the actuator;

measuring, by at least one sensor, at least one actual value of at least one operating property of the clutch;

determining a regulated modulation voltage by comparing the at least one actual value, or a calculated value derived from the at least one actual value, to a required value, wherein the required value is determined via a characteristic of the clutch stored in a control device for the clutch;

modulating an electric voltage supplied to the actuator, the voltage determining the operation of the actuator, in accordance with the following formula:

$$U_M = U_{MSt}*w + U_{MR}*(1-w), \text{ whereby}$$

$U_M$ is the electric voltage supplied to the actuator, w is a weighting factor that can assume values of between 0 and 1, $U_{MSt}$ is a controlled modulation voltage that is controlled in a defined manner by the actuator model and the required travel modulation, and, $U_{MR}$ is the regulated modulation voltage regulated by the control device, which regulated modulation voltage is a magnitude that characterizes an operating state of the clutch on the basis of the deviation between the required value and the actual value of the operating property of the clutch.

2. The process recited in claim 1, wherein the actuator model is given via the following equation:

$$\ddot{x} - k*\dot{x} = K_U*U, \text{ whereby}$$

U is a resultant voltage which represents the controlled modulation voltage $U_{MSt}$, x is an adjustment travel of a part moved by the actuator, $$k=(i_{total}*K\Phi)^2/M_{actuator}R_a \text{ and } K_U=I_{total}*K\Phi/M_{actuator}R_a, \text{ whereby}$$

$M_{actuator} = I_{E\text{-motor}}*i^2_{total}$,
$I_{total}$ = Total gear ratio,
$K\Phi$ = electrical constant of the electric motor forming the actuator, and,
$R_a$ = resistance.

3. The process recited in claim 1, wherein the value of the weighting factor multiplied with the modulation voltage $U_{MSt}$ varies depending on an amplitude of the clutch-grabbing oscillation.

4. The process recited in claim 1, wherein an offset voltage is added to the modulation control voltage $U_{MSt}$, which offset voltage depends on the clutch position and the operating direction of the clutch.

5. A device for the reduction of clutch-grabbing oscillations in a motor vehicle drive train, including a drive motor (2) operatively arranged to be connected via a clutch (4) with a drive train portion (6, 8) in a torque transmitting manner, said device comprising:

an electric motor actuator (27) for controlling operation of the clutch;

at least one sensor for determining the presence of clutch-grabbing oscillations in the drive train and for determining operating conditions of the drive train; and, an electronic control device (32) that controls the operation of the actuator to attain a moment transmitted by the clutch, wherein the moment has a value depending on the operating conditions of the drive train, wherein the electronic control device controls the actuator and determines the moment to be transmitted by the clutch based on an electric voltage, wherein the electric voltage is modulated in accordance with the following formula:

$$U_M = U_{MSt}*w + U_{MR}*(1-w), \text{ whereby}$$

$U_M$ is the electric voltage, w is a weighting factor that can assume values of between 0 and 1, $U_{MSt}$ is a controlled modulation voltage that is controlled in a defined manner by an actuator model of the actuator and a required travel modulation, and, $U_{MR}$ is a regulated modulation voltage regulated by the control device, which regulated modulation voltage is a magnitude that characterizes an operating state of the clutch on the basis of a deviation between a required value and the actual value of the operating conditions of the drive train determined by the at least one sensor.

* * * * *